(12) United States Patent
Matsuoka (10) Patent No.: US 9,094,587 B2
(45) Date of Patent: Jul. 28, 2015

(54) IMAGE PROCESSING APPARATUS AND IMAGE PROCESSING METHOD

(71) Applicant: CANON KABUSHIKI KAISHA, Tokyo (JP)

(72) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/594,818

(22) Filed: Jan. 12, 2015

(65) Prior Publication Data

US 2015/0124118 A1    May 7, 2015

Related U.S. Application Data

(63) Continuation of application No. 13/829,340, filed on Mar. 14, 2013, now Pat. No. 8,957,986.

(30) Foreign Application Priority Data

Apr. 26, 2012    (JP) ................................. 2012-101671

(51) Int. Cl.
*H04N 5/235* (2006.01)
*H04N 5/217* (2011.01)
*H04N 5/243* (2006.01)

(52) U.S. Cl.
CPC ........... *H04N 5/2176* (2013.01); *H04N 5/2352* (2013.01); *H04N 5/2353* (2013.01); *H04N 5/243* (2013.01)

(58) Field of Classification Search
CPC ... H04N 5/243; H04N 5/2352; H04N 5/2355; H04N 5/23248; H04N 5/23287; H04N 5/23254; H04N 5/23219
USPC ................................ 348/229.1, 222.1, 208.6, 348/208.12–208.14
See application file for complete search history.

(56) References Cited

U.S. PATENT DOCUMENTS

| | | | | |
|---|---|---|---|---|
| 6,801,248 | B1 * | 10/2004 | Horiuchi | 348/208.13 |
| 8,483,452 | B2 * | 7/2013 | Ueda et al. | 382/118 |
| 2007/0165947 | A1 * | 7/2007 | Paik | 382/169 |
| 2008/0252750 | A1 * | 10/2008 | Ogawa | 348/229.1 |
| 2009/0002520 | A1 * | 1/2009 | Yoshida et al. | 348/226.1 |

* cited by examiner

*Primary Examiner* — Sinh Tran
*Assistant Examiner* — Zhenzhen Wu
(74) *Attorney, Agent, or Firm* — Canon USA, Inc., I.P. Division (57) ABSTRACT

An image processing apparatus includes a calculation unit configured to calculate a first gain for adjusting brightness of a first image and a second image based on the first image captured at a first exposure amount and the second image captured at a second exposure amount, a division unit configured to divide the first gain into a second gain which changes according to a position in an image and a third gain which does not change according to a position in an image, a first gain correction unit configured to perform gain correction on the second image with the second gain, and a second gain correction unit configured to perform gain correction on the second image with the third gain.

10 Claims, 10 Drawing Sheets

PRIOR ART

IMAGE PROCESSING APPARATUS AND IMAGE PROCESSING METHOD

CROSS REFERENCE OF RELATED APPLICATIONS

This application is a continuation of U.S. application Ser. No. 13/829,340 filed Mar. 14, 2013 which claims priority from Japanese Patent Application No. 2012-101671 filed Apr. 26, 2012, each of which is hereby incorporated by reference herein in its entirety.

BACKGROUND OF THE INVENTION

1. Field of the Invention

The present invention relates to an image processing apparatus capable of correcting unevenness of exposure amounts.

2. Description of the Related Art

Conventionally, it has been known that variation in opening time and closing time of a shutter may cause unevenness in an exposure amount of an image sensor, and correcting such unevenness of the exposure amount has been requested.

As a method for correcting the unevenness of the exposure amount, for example, a technique such as discussed in Japanese Patent Application Laid-Open No. 8-154201 has been employed. According to the technique discussed in Japanese Patent Application Laid-Open No. 8-154201, a gain is calculated based on an image signal, and a gain of an image signal is adjusted according to that gain. Through this, a gain of an image captured at a different exposure amount can be precisely adjusted according to the level of the image signal. In Japanese Patent Application Laid-Open No. 8-154201, correction of two-dimensional exposure amount unevenness of the exposure on an imaging plane is not taken into consideration.

SUMMARY OF THE INVENTION

The present invention is directed to an image processing apparatus and an image processing method capable of correcting two-dimensional exposure amount unevenness on an imaging plane.

According to an aspect of the present invention, an image processing apparatus includes a calculation unit configured to calculate a first gain for adjusting brightness of a first image and a second image based on the first image captured at a first exposure amount and the second image captured at a second exposure amount, a division unit configured to divide the first gain into a second gain which changes according to a position in an image and a third gain which does not change according to a position in an image, a first gain correction unit configured to perform gain correction on the second image with the second gain, and a second gain correction unit configured to perform gain correction on the second image with the third gain.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
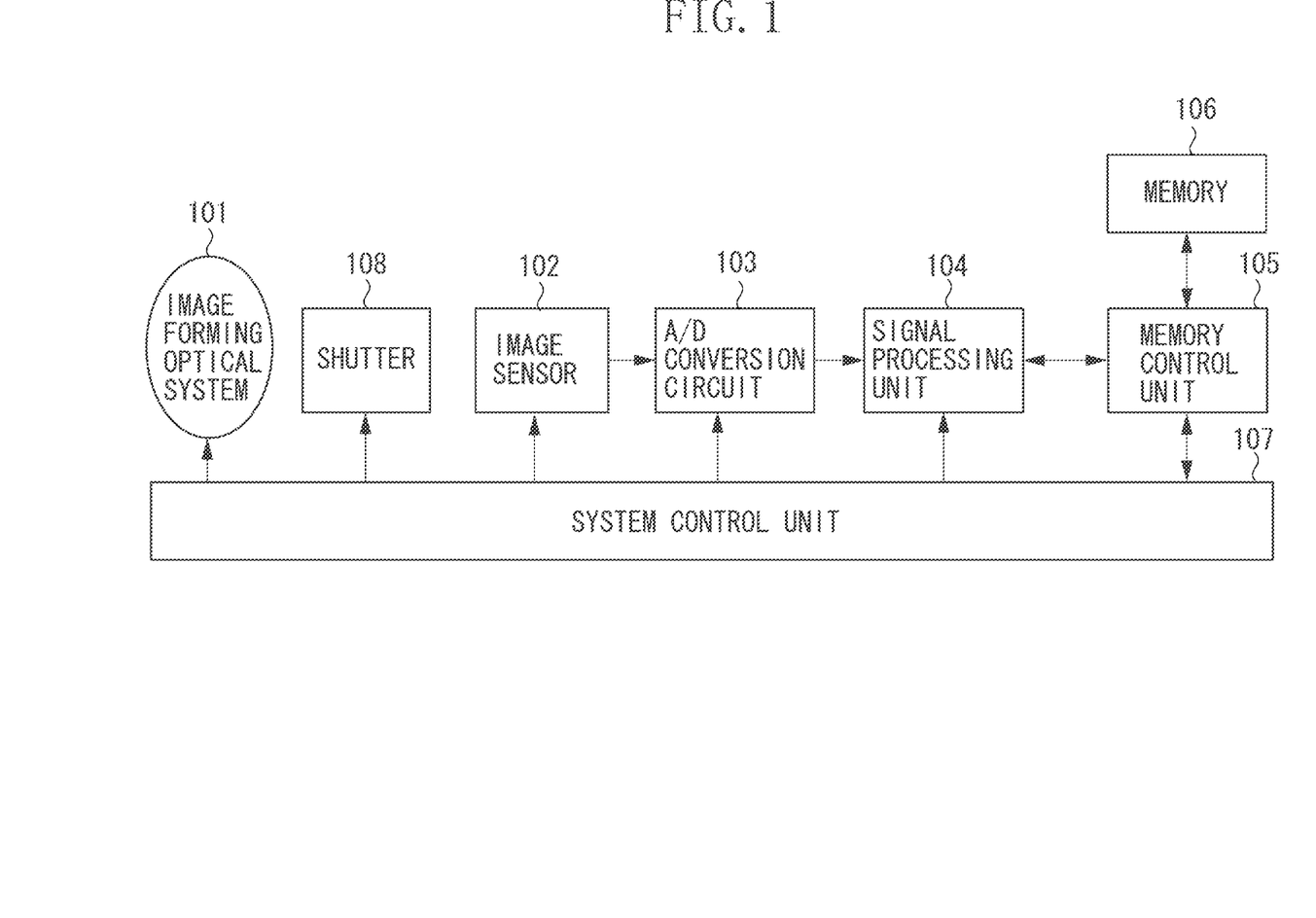
FIG. 1 is a block diagram illustrating a configuration of an image processing apparatus according to a first exemplary embodiment.

An image processing apparatus according to a first exemplary embodiment will be described below with reference to FIG. 1. In FIG. 1, an image forming optical system 101 includes a lens and the like, and performs a zoom adjustment and a focus adjustment by moving back and forth in an optical axis direction. A shutter 108 performs an exposure time adjustment by using a time difference in which a leading curtain and a trailing curtain pass through an imaging plane. An image sensor 102 is a charge coupled device (CCD) or the like which converts an optical image into an electric signal. An analog-digital (A/D) conversion circuit 103 converts an analog image signal from the image sensor 102 into a digital image signal. A signal processing unit 104 performs correction of a positional deviation on an image signal output from the A/D conversion circuit 103. A memory control unit 105 reads and writes image signal data from/into a memory (dynamic random access memory (DRAM)) 106. A system control unit 107 controls operations of the entire image processing apparatus.

Figure 6A:
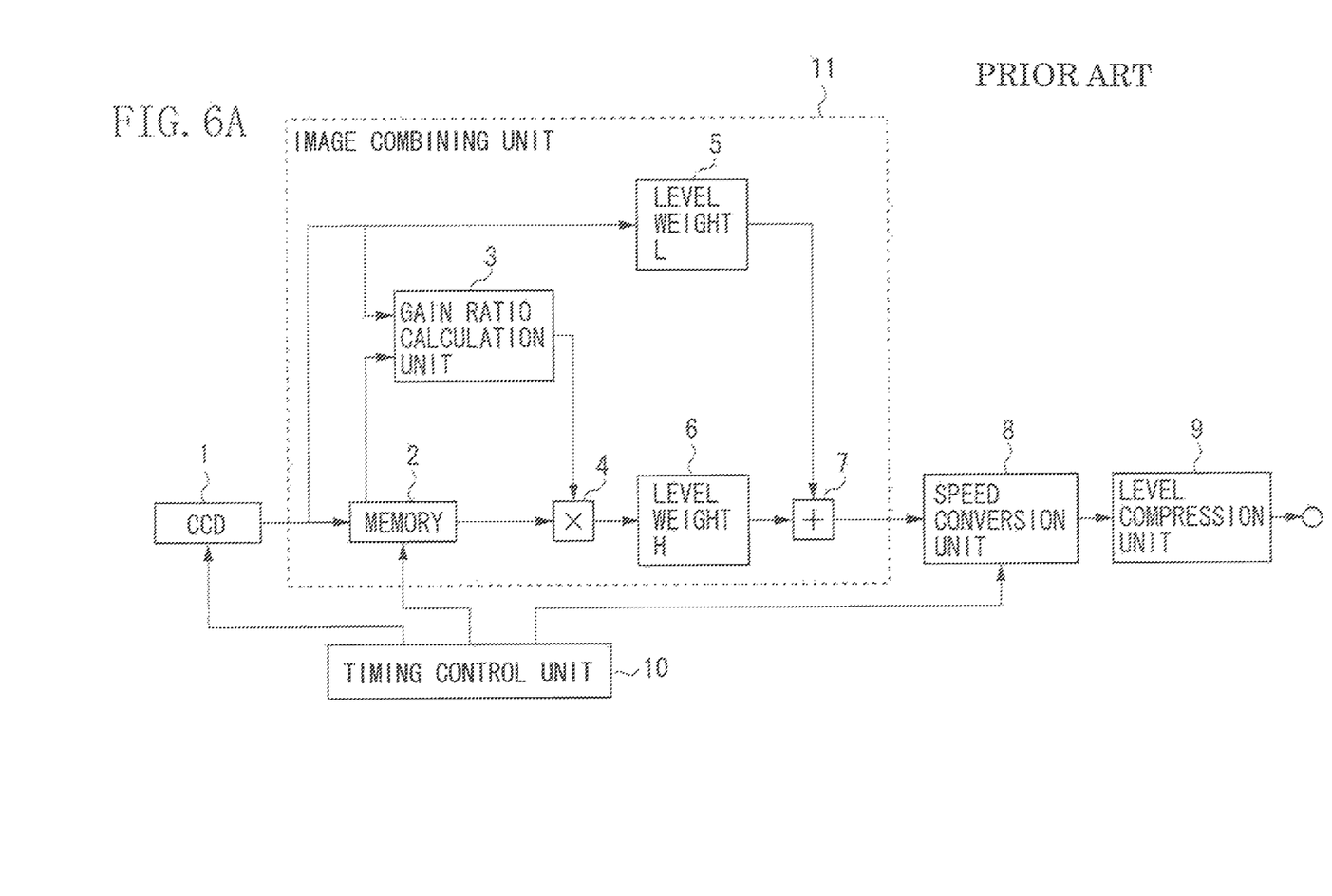
FIGS. 6A and 6B are a block diagram and a graph illustrating a configuration of an image processing apparatus according to a conventional technique.
Figure 6B:
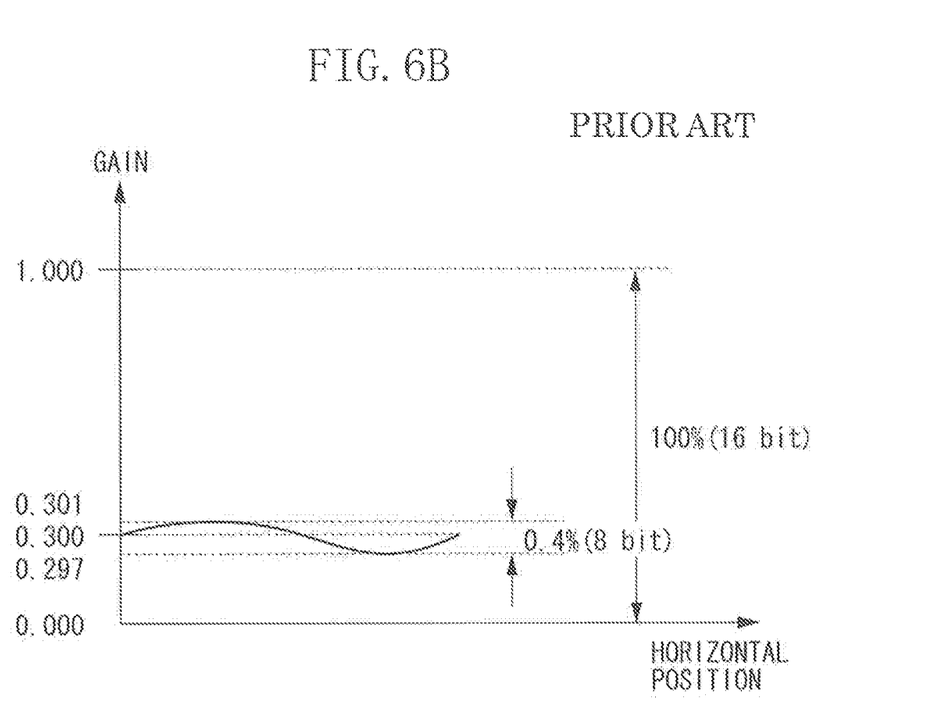

The correction of exposure amount unevenness on the imaging plane performed by the configuration according to Japanese Patent Application Laid-Open No. 8-154201 will be considered. FIG. 6A is a block diagram illustrating an image combining apparatus according to Japanese Patent Application Laid-Open No. 8-154201. An input image is combined after gains between two images in different exposure amounts have been adjusted by a multiplication unit. In the graph in FIG. 6B, a horizontal axis represents a horizontal position whereas a vertical axis represents a gain as a correction amount. An amount of exposure for an image multiplied by the gain is greater. Therefore, the gain is provided in such a manner that the exposure amount is generally reduced by a value of 0.3 (i.e., gain-down by 0.3), approximately. This correction characteristic is assumed to have a characteristic configured of combination of a gain due to a general difference in exposure amounts between two images (0.300), and a gain due to exposure amount unevenness in the horizontal direction (0.297 through 0.301). At this time, if gain correction can be performed with respect to a gain range of 0.4% at accuracy of approximately 8-bit, the gain correction can be performed faithfully to the calculated gain. However, in such a case, 16-bit accuracy will be required for the gain correction with respect to the gain range of 100%. In other words, the 16-bit accuracy will be also required for a multiplication unit, so that, with the configuration illustrated in FIG. 6A, a circuit size of the multiplication unit will be remarkably large.

Figure 2A:
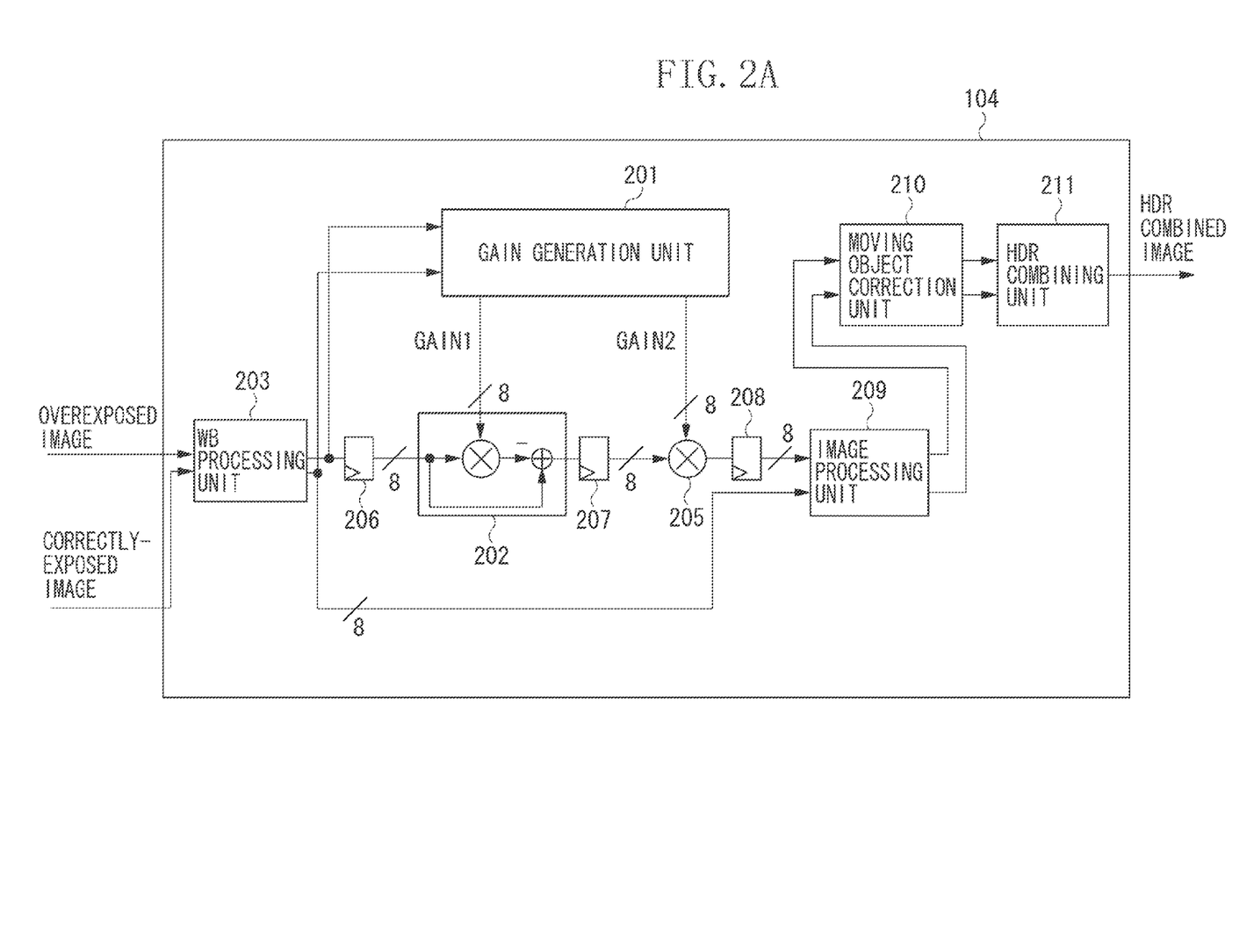
FIGS. 2A and 2B are a block diagram and a graph illustrating a configuration of a signal processing circuit according to the first exemplary embodiment.
Figure 2B:
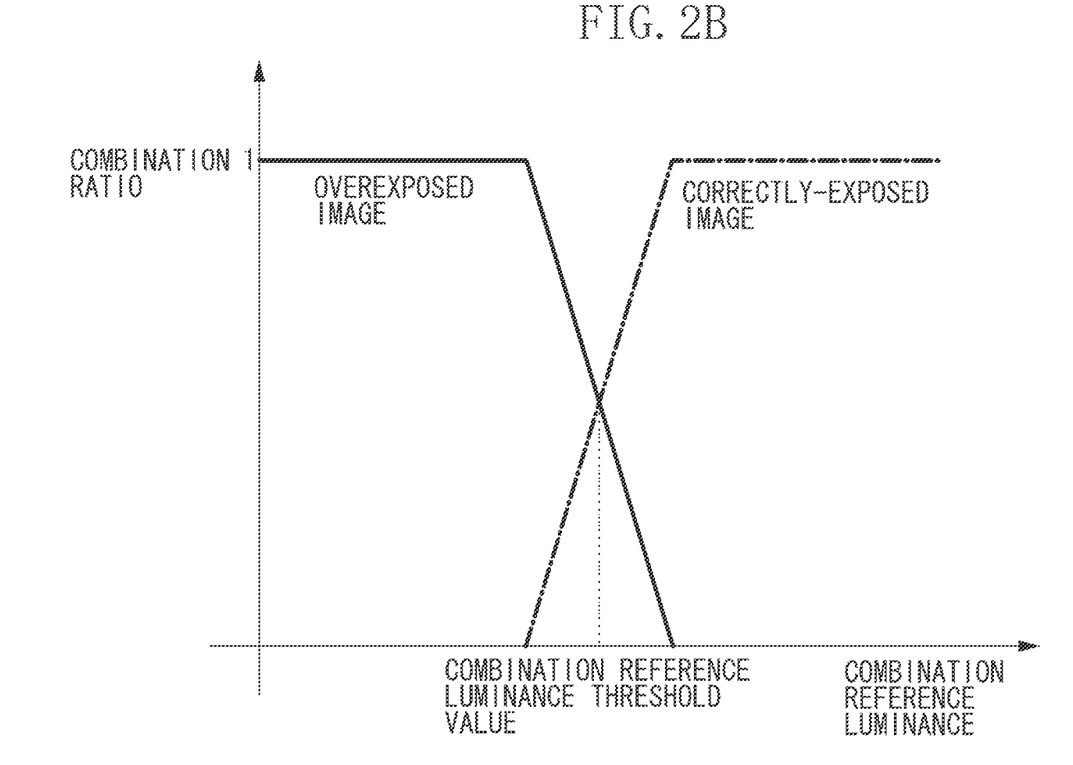

Therefore, in the present exemplary embodiment, by employing the configuration illustrated in FIGS. 2A and 2B, correction of exposure amount unevenness can be realized at high accuracy with a smaller circuit size.

FIG. 2A is a block diagram illustrating a configuration of the signal processing unit 104. A first image (overexposed image) captured at a first exposure amount and a second image (correctly-exposed image) captured at a second exposure amount are input to the signal processing unit 104 as input images. Based on the image signals of the first and the second images, a gain generation unit 201 calculates a gain (first gain). Then, the gain generation unit 201 divides the first gain into a GAIN1 (second gain) that changes according to a pixel position in the image, and a GAIN2 (third gain) that is constant in any pixel position. A multiplication circuit 202 multiplies the GAIN1, and a multiplication circuit 205 multiplies the GAIN2.

A white balance (WB) processing unit 203 analyzes the input images, and performs conventional white balance processing. According to the present exemplary embodiment, in order to unify colors of a combined image, the white balance processing is performed on the correctly-exposed image and the overexposed image using the same white balance coefficient.

Flip-flop circuits 206, 207, and 208 perform pipeline processing to divide the multiplication processing of the GAIN1 and the GAIN2.

An image processing unit 209 performs general image processing, such as synchronization processing, matrix transformation processing (development processing), gamma processing, and distortion correction processing, on the input image, and outputs a developed image.

A moving object correction unit 210 corrects a moving object region with respect to the input image of which the gain of the image signal has been adjusted.

A high dynamic range (HDR) combining unit 211 generates a combined image by combining the overexposed image and the correctly-exposed image. Hereinbelow, the combined image is referred to as a high dynamic range (HDR) combined image in which a dynamic range is expanded. In addition, processing for combining the overexposed image and the correctly-exposed image will be referred to as HDR combining processing.

According to the present exemplary embodiment, a dynamic range of a dark portion is expanded by combining the correctly-exposed image and the overexposed image through the HDR combining processing.

FIGS. 3A through 3D illustrate the GAIN1 calculated by the gain generation unit 201 in FIG. 2A.

Figure 3A:
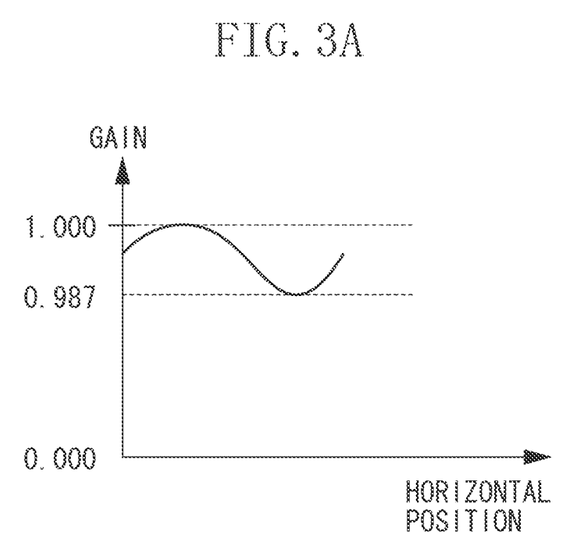
FIGS. 3A through 3D illustrate gains according to the first exemplary embodiment.

FIG. 3A is a graph illustrating a relationship of a pixel position and a gain by the GAIN1, and a horizontal axis represents a horizontal position whereas a vertical axis represents a gain. According to the present exemplary embodiment, the gain by the GAIN1 changes according to the horizontal position. However, the present invention is not limited to the above example and may be configured in such a manner that the gain by the GAIN1 changes according to a vertical position or a two-dimensional pixel position. In order to realize the gain illustrated in FIG. 3A, the multiplication circuit 202 performs multiplication calculation expressed by the following equation.

$$OUT1=IN1\times(1-GAIN1/16384) \qquad \text{Equation 1}$$

"OUT1" and "IN1" represent an output and an input of the multiplication circuit 202 respectively. The GAIN1 takes a value between 0 through 255. The calculation of the equation 1 is expanded to the following equation.

$$OUT1=IN1-IN1\times(GAIN1/16384) \qquad \text{Equation 2}$$

Accordingly, the multiplication circuit 202 can realize a subtraction at 8-bit accuracy and a multiplication at 8-bit accuracy through a bitwise right shift (14-bit shift).

The multiplication circuit 205 performs multiplication calculation expressed by the following equation.

$$OUT2=IN2\times(GAIN2/256) \qquad \text{Equation 3}$$

"OUT2" and "IN2" represent an output and an input of the multiplication circuit 205 respectively. The GAIN2 takes a value between 0 through 255. Accordingly, the multiplication circuit 205 can realize a multiplication at 8-bit accuracy through a bitwise right shift (8-bit shift).

The gain generation unit 201 calculates the gain and divides that gain into a gain of the multiplication circuit 202 and a gain of the multiplication circuit 205 from the equation 0.301=GAIN2/256, and therefore, the GAIN2 is calculated as 77. Then, the gain is multiplied by both the multiplication circuits 202 and 205, so that a gain range of (77/256)×(1−255/16384) and (77/256)×(1−0/16384), i.e., a gain range of 0.296 through 0.301 can be multiplied at 8-bit accuracy. Accordingly, a gain range and multiplication accuracy equivalent to those illustrated in FIG. 6B can be realized. In addition, the multiplication circuits 202 and 205 share the multiplication processing performed through the configuration illustrated in FIG. 6A. Therefore, a circuit size for one multiplication circuit can be smaller, and a difficulty level of the circuit design can be lowered.

Figure 3B:
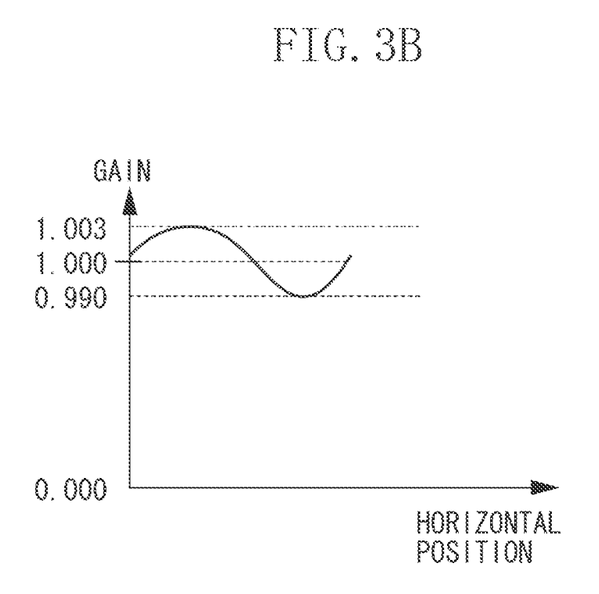
Figure 3C:
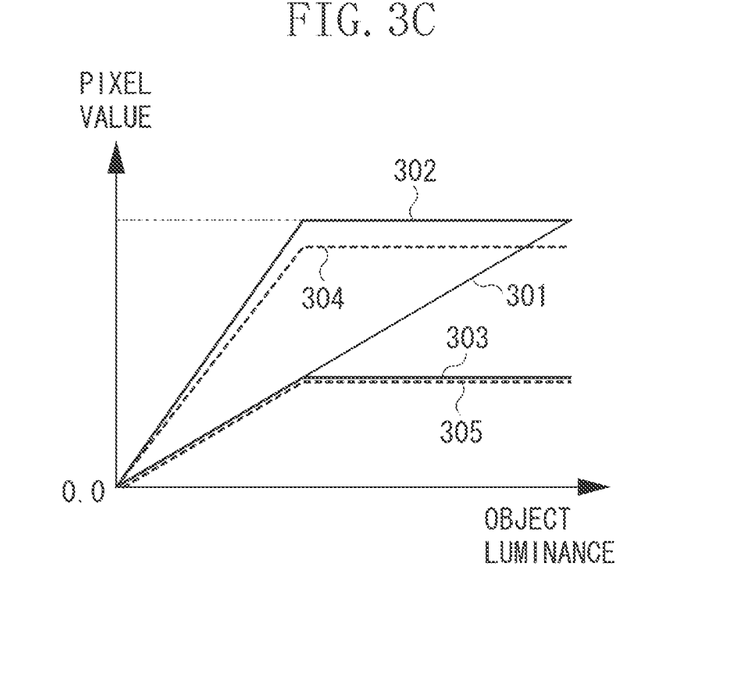

FIG. 3C is a graph illustrating gain adjustment processing for adjusting the overexposed image to the correctly-exposed image using the gain in FIG. 3A that can be realized by the multiplication circuit 202. A horizontal axis represents an object luminance whereas a vertical axis represents a pixel value. An image signal 301 is an image signal of the correctly-exposed image, an image signal 302 is an image signal of the overexposed image, and an image signal 303 is a target image signal after the gain correction. An image signal 304 is an image signal on which the gain correction has been performed by the multiplication circuit 202, and an image signal 305 is an image signal on which the gain correction has been performed by the multiplication circuit 205. The image signal 305 coincides with the target image signal 303.

Figure 3D:
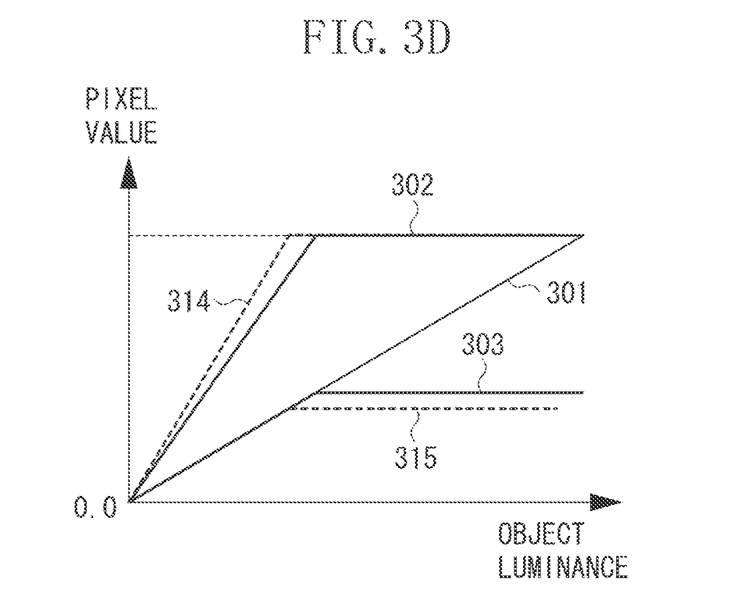

On the other hand, FIG. 3D is a graph illustrating the gain adjustment processing for adjusting the overexposed image to the correctly-exposed image using the gain in FIG. 3B that cannot be realized by the multiplication circuit 202. A horizontal axis represents an object luminance whereas a vertical axis represents a pixel value. An image signal 314 is an image signal on which the gain correction has been performed by the multiplication circuit 202, and an image signal 315 is an image signal on which the gain correction has been performed by the multiplication circuit 205. Because the gain in FIG. 3B includes a gain of which value is greater than 1, an image signal in the proximity of a saturated pixel value is deteriorated in the image signal 314. As a result, the image signal 315 does not coincide with the target image signal 303.

Since the multiplication circuit 202 performs the multiplication calculation expressed by the equation 1, and the gain of which value is greater than 1 as illustrated in FIG. 3B is not included, the gain correction can be performed without causing the image signal to be deteriorated.

According to the present exemplary embodiment, the multiplication circuit 202 performs the multiplication processing expressed by the equation 1 while the gain correction range is fixed to 0.984 through 1.000. However, the present invention is not limited to the above example, and the gain correction range may be changed as necessary. For example, the gain correction may be performed by shifting the gain correction range among a case of an equation 4 indicated below, a case of the equation 1, and a case of no gain correction, as appropriate.

$$\text{OUT1}=\text{IN1}\times(1-\text{GAIN1}/4096) \quad \text{Equation 4}$$

By employing the equation 4, the correction can be performed with a wider gain correction range of 0.938 through 1.000.

For example, the level of exposure amount unevenness generated two-dimensionally on the imaging plane may change depending on variation in time in which the leading curtain and the trailing curtain pass through the imaging plane. In a case where the left side of the leading curtain passes through the imaging plane later than the right side thereof, for example, the exposure time on the left side thereof will be shorter for the period being late, and thus the exposure amount on the left side of the imaging plane will be less than that on the right side thereof. In addition, if variation in time is a comparable level, the influence from the variation in time becomes greater when the exposure time is shorter, so that the level of two-dimensional exposure amount unevenness becomes worse for the case with shorter exposure time than for the case with longer exposure time.

Therefore, in a case where the exposure time of the input image with less exposure amount is shorter than a certain threshold value, the equation 4 with wider gain correction range is selected because the two-dimensional exposure amount unevenness will be changed significantly. On the contrary, in a case where the exposure time is longer than a certain threshold value, the two-dimensional exposure amount unevenness changes gradually. Thus, the correction level of the two-dimensional exposure amount unevenness may be limited by selecting the equation 1 with sensitive gain correction accuracy. Furthermore, if the exposure time thereof is sufficiently long, the no gain correction may be selected.

In addition, the multiplication processing of the multiplication circuit 202 may be performed by an equation 5 indicated below, so that the correction level of the two-dimensional exposure amount unevenness is limited by making a value "$\alpha$" smaller when the exposure time of the input image with less exposure amount is longer.

$$\text{OUT1}=\text{IN1}\times(1-(\alpha\times\text{GAIN1})/4096) \quad \text{Equation 5}$$

"$\alpha$" is a value between 0 through 1.

In addition, instead of changing the processing according to the exposure time of the input image with less exposure amount, the correction level of the two-dimensional exposure amount unevenness may be limited when a difference between two exposure times is smaller.

The moving object correction unit 210 detects a region where a moving object image is formed by calculating a pixel difference value of two images of which image signals are subjected to gain adjustment by the multiplication circuits 202 and 205. A region of which difference value is greater than a predetermined value is regarded as a moving object region, so that the image signal of the image with greater exposure amount is replaced with the image signal of the image with less exposure amount. A region of which difference value is less than the predetermined value is regarded not as a moving object region, so that the image signal of the image with greater exposure amount is applied as it is, and an image signal of a region therebetween is replaced with an image signal obtained from a weighted addition of image signals of the two images. In this manner, the moving object region detected in the image with greater exposure amount is corrected. Through the above-described moving object correction processing, a position of the moving object captured in the image with greater exposure amount can be adjusted to a position of the same moving object captured in the image with less exposure amount without causing overexposure of the moving object image.

As illustrated in FIG. 2B, the HDR combining unit 211 outputs the image signal of the correctly-exposed image with less exposure amount as it is in a bright region and outputs the image signal of the overexposed image with greater exposure amount in a dark region. Further, the HDR combining unit 211 outputs the image signal obtained from a weighted addition of the image signals of the two images in a region other than the above-described regions. Accordingly, the HDR combining unit 211 can generate an image with a wide dynamic range.

As described above, according to the present exemplary embodiment, the gain for adjusting the exposure amount is divided into the GAIN1 which changes according to a pixel position and the GAIN2 which is constant for any pixel position. Then, the image signal of the input image with different exposure amount is multiplied by the GAIN1 and the GAIN2, respectively. Accordingly, the two-dimensional exposure amount unevenness on the imaging plane can be corrected by a smaller size circuit.

According to the present exemplary embodiment, combining processing by the HDR combining unit 211 is performed on the developed image that is output after going through the processing by the image processing unit 209. However the present invention is not limited to the above example, and the combining processing may be executed on the image before going through the processing by the image processing unit 209, especially before the development processing.

Further, according to the present exemplary embodiment, the HDR combining processing is performed using two images such as the overexposed image and the correctly-exposed image. However, the HDR combining processing may be performed by generating three or more images with different exposure. In such a case, a gain based on an image with the lowest exposure may be set to the other images with different exposure.

An image processing apparatus according to a second exemplary embodiment of the present invention will be described below with reference to FIG. 1. The image processing apparatus according to the second exemplary embodiment is similar to the image processing apparatus according to the first exemplary embodiment except for the signal processing circuit 104.

Figure 4:
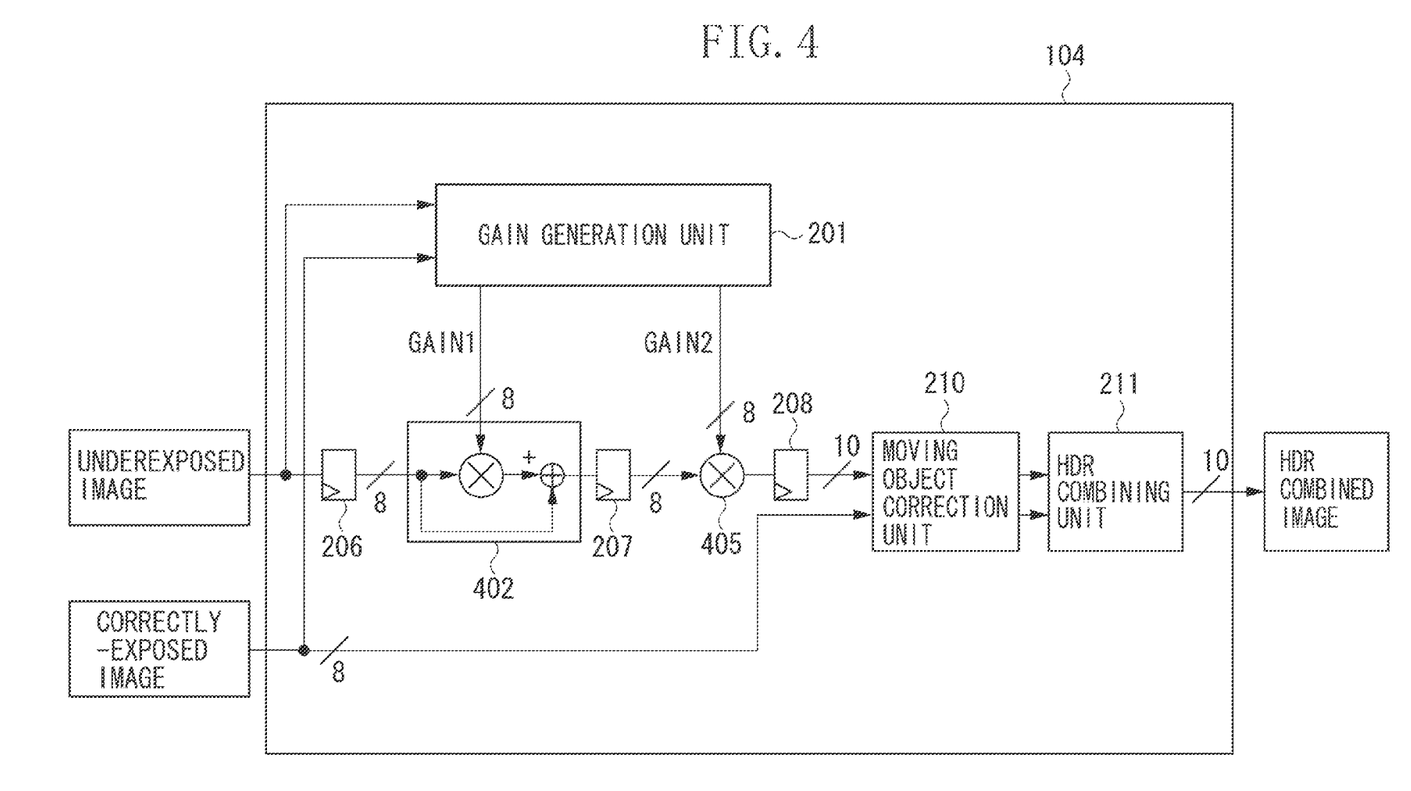
FIG. 4 is a block diagram illustrating a configuration of a signal processing circuit according to a second exemplary embodiment.

FIG. 4 is a block diagram illustrating a configuration of the signal processing circuit 104. The signal processing circuit 104 according to the second exemplary embodiment is similar to the signal processing circuit 104 according to the first exemplary embodiment except for a multiplication circuit 402 and a multiplication circuit 405.

According to the present exemplary embodiment, a dynamic range of a bright portion is expanded by combining a correctly-exposed image and an underexposed image through HDR combining processing.

FIGS. 5A through 5D are graphs illustrating the GAIN1.

Figure 5A:
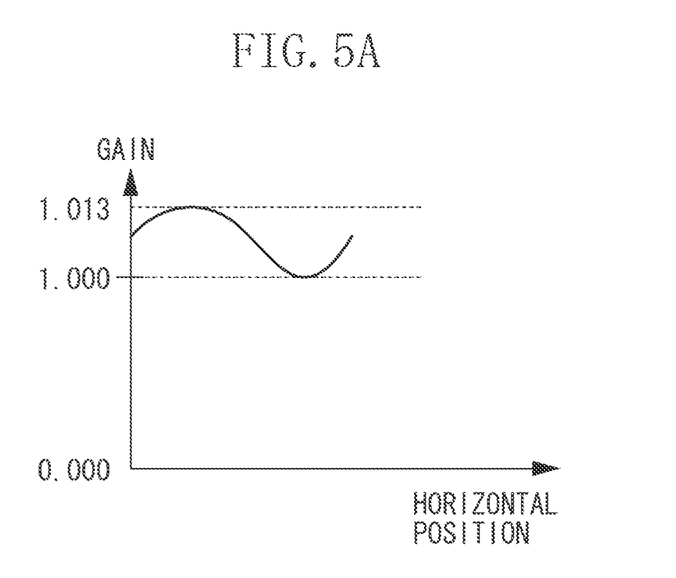
FIGS. 5A through 5D illustrate gains according to the second exemplary embodiment.

FIG. 5A is a graph illustrating a relationship of a pixel position and a gain by the GAIN1, and a horizontal axis represents a horizontal position whereas a vertical axis represents a gain. According to the present exemplary embodiment, the gain by the GAIN1 changes according to the horizontal position. However, the present invention is not limited to the above example, and the gain by the GAIN1 may change according to a vertical position or a two-dimensional pixel position. In order to realize the gain illustrated in FIG. 5A, the multiplication circuit 402 performs multiplication calculation expressed by the following equation.

$$OUT1 = IN1 \times (1 + GAIN1/16384) \qquad \text{Equation 6}$$

"OUT1" and "IN1" represent an output and an input of the multiplication circuit 402 respectively. The GAIN1 takes a value between 0 through 255. The calculation of the equation 6 is expanded to the following equation.

$$OUT1 = IN1 + IN1 \times (GAIN1/16384) \qquad \text{Equation 7}$$

Accordingly, the multiplication circuit 402 can realize an addition at 8-bit accuracy and a multiplication at 8-bit accuracy through a bitwise right shift (14-bit shift).

The multiplication circuit 405 performs multiplication calculation expressed by the following equation.

$$OUT2 = IN2 \times (GAIN2/64) \qquad \text{Equation 8}$$

"OUT2" and "IN2" represent an output and an input of the multiplication circuit 405 respectively. The GAIN2 takes a value between 0 through 255. Accordingly, the multiplication circuit 405 can realize a multiplication at 8-bit accuracy through a bitwise right shift (6-bit shift). According to the present exemplary embodiment, a difference in values between the exposure amount of the underexposed image and the exposure amount of the correctly-exposed image is set to be less than fourfold the value. Therefore, a gain range of the multiplication circuit 405 is set to be (0/64) through (255/64), i.e., 0.0 through 3.9. However, the present invention is not limited to this gain range and may be configured to cover a wider gain range according to a required exposure difference.

The gain generation unit 201 divides a gain required for correction processing into a gain of the multiplication circuit 402 and a gain of the multiplication circuit 405. For example, if the gain of the multiplication circuit 405 is 3.3, from the equation 3.3=GAIN2/64, the GAIN2 is calculated as 211. Therefore, the gain is multiplied by both the multiplication circuits 402 and 405, and thus, a gain range of (211/64)×(1+0/16384) through (211/64)×(1+255/16384), i.e., a gain range of 3.297 through 3.348 can be multiplied at 8-bit accuracy. Accordingly, in the similar manner to the first exemplary embodiment, an exposure amount unevenness component generated two-dimensionally can be precisely corrected at 8-bit accuracy. Further, because the multiplication circuits 402 and 405 share and perform the multiplication processing, a circuit size for one multiplication circuit can be smaller, and as in the similar manner to the first exemplary embodiment, a difficulty level of the circuit design can be lowered.

Figure 5B:
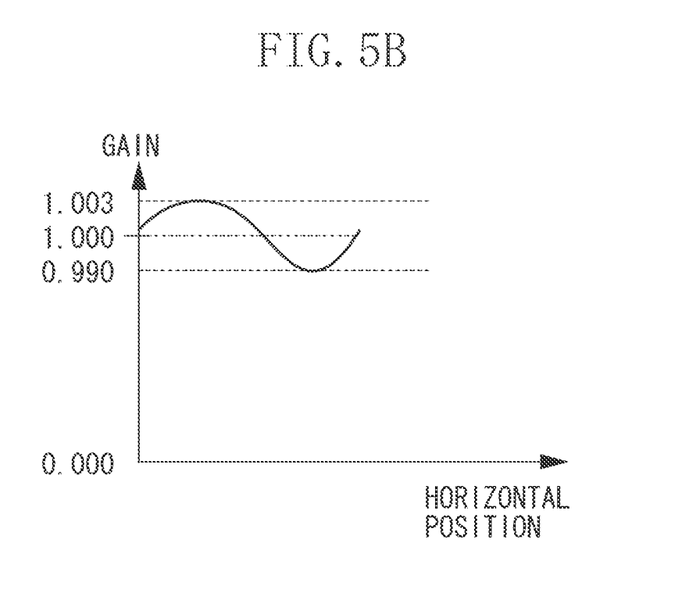
Figure 5C:
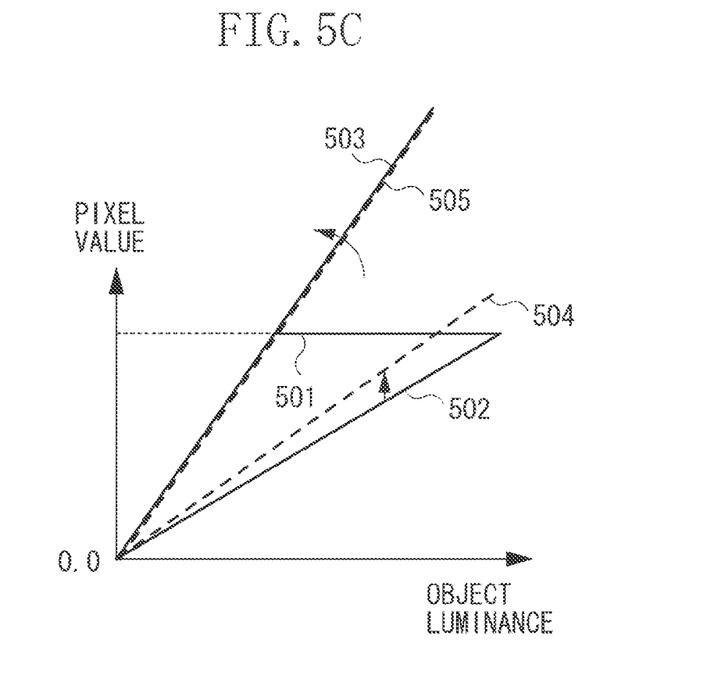

FIG. 5C is a graph illustrating gain adjustment processing for adjusting the underexposed image to the correctly-exposed image using the gain in FIG. 5A that can be realized by the multiplication circuit 402. A horizontal axis represents an object luminance whereas a vertical axis represents a pixel value. An image signal 501 is an image signal of the correctly-exposed image, an image signal 502 is an image signal of the underexposed image, and an image signal 503 is a target image signal after the gain correction. An image signal 504 is an image signal on which the gain correction has been performed by the multiplication circuit 402, and an image signal 505 is an image signal on which the gain correction has been performed by the multiplication circuit 405. The image signal 505 coincides with the target image signal 503.

Figure 5D:
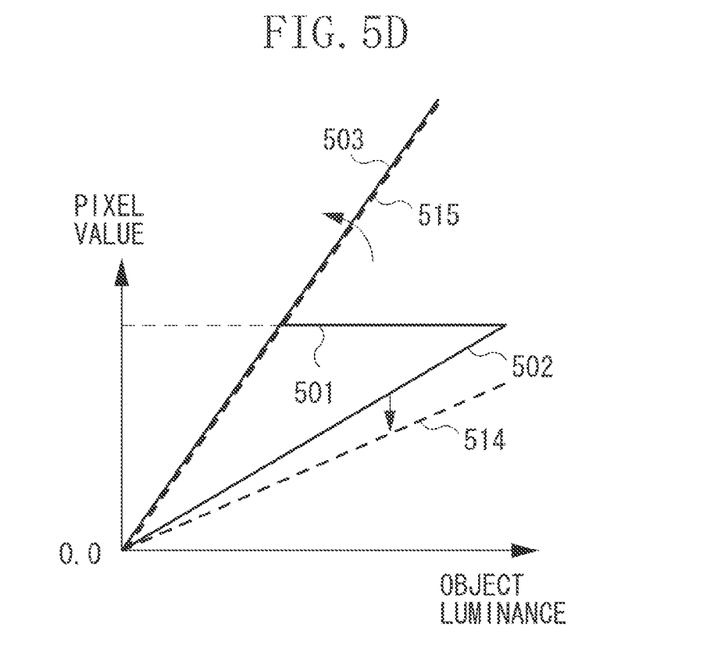

On the other hand, FIG. 5D is a graph illustrating the gain adjustment processing for adjusting the underexposed image to the correctly-exposed image using the gain in FIG. 5B that cannot be realized by the multiplication circuit 402. A horizontal axis represents an object luminance whereas a vertical axis represents a pixel value. An image signal 514 is an image signal on which the gain correction has been performed by the multiplication circuit 402, and an image signal 515 is an image signal on which the gain correction has been performed by the multiplication circuit 405. The gain in FIG. 5B includes a gain of which value is less than 1. Therefore, a round-off error of the multiplication becomes unnecessary large in the image signal 514. As a result, although the image signal 515 mostly coincides with the target image signal 503, the round-off error thereof becomes unnecessary large.

The multiplication calculation of the multiplication circuit 402 is expressed by the equation 6, and the gain of which value is less than 1 as illustrated in FIG. 5B is not included. Therefore, the gain correction can be performed without causing the round-off error to be unnecessary large.

As described above, according to the present exemplary embodiment, the gain for adjusting the exposure amount is divided into the GAIN1 which changes according to a pixel position and the GAIN2 which is constant for any pixel position. Then, the image signal of the input image with different exposure amount is multiplied by the GAIN1 and the GAIN2, respectively. Accordingly, the two-dimensional exposure amount unevenness on the imaging plane can be corrected by a smaller size circuit.

Further, according to the present exemplary embodiment, HDR combining processing is performed using two images such as the underexposed image and the correctly-exposed image. However, the HDR combining processing may be performed by generating three or more images with different exposure. In such a case, a gain based on an image with the highest exposure may be set to the other images with different exposure.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
a first correction unit configured to perform first correction, based on a first image captured at a first exposure amount and a second image captured at a second exposure amount, on the first image, using a gain for at least one of regions of the first image, the gain being different from gains for other regions of the first image;
a second correction unit configured to perform second correction on the first image, using a same gain for all of the regions of the first image;
an image processing unit configured to perform image processing; and
a detection unit configured to perform moving object region detection based on a corrected first image, on which the first correction and the second correction are performed, and the second image,
wherein the image processing unit performs the image processing after the first correction and the second correction are performed, and
wherein the detection unit performs the moving object region detection after the image processing is performed.

2. The image processing apparatus according to claim 1, wherein the first exposure amount is greater than the second exposure amount.

3. The image processing apparatus according to claim 1, wherein the detection unit performs the moving object region detection by calculating a pixel difference value between the corrected first image and the second image.

4. The image processing apparatus according to claim 1, wherein the second correction unit performs the second correction after the first correction is performed.

5. The image processing apparatus according to claim 1, wherein the image processing includes synchronization processing.

6. The image processing apparatus according to claim 1, wherein the image processing includes matrix transformation processing.

7. The image processing apparatus according to claim 1, wherein the image processing includes gamma processing.

8. The image processing apparatus according to claim 1, wherein the image processing includes distortion correction processing.

9. A method for performing image processing, the method comprising:
performing first correction, based on a first image captured at a first exposure amount and a second image captured at a second exposure amount, on the first image, using a gain for at least one of regions of the first image, the gain being different from gains for other regions of the first image;
performing second correction on the first image, using a same gain for all of the regions of the first image;
performing image processing; and
performing moving object region detection based on a corrected first image, on which the first correction and the second correction are performed,
wherein the image processing is performed after the first correction and the second correction are performed, and
wherein the moving object region detection is performed after the image processing is performed.

10. A non-transitory computer readable storage medium storing a program for causing a computer to execute each step of a method according to claim 9.

* * * * *